United States Patent
Bi et al.

(10) Patent No.: US 6,836,758 B2
(45) Date of Patent: Dec. 28, 2004

(54) SYSTEM AND METHOD FOR HYBRID VOICE RECOGNITION

(75) Inventors: Ning Bi, San Diego, CA (US); Andrew P. DeJaco, San Diego, CA (US); Harinath Garudadri, San Diego, CA (US); Chienchung Chang, Rancho Santa Fe, CA (US); William Yee-Ming Huang, San Diego, CA (US); Narendranath Malayath, San Diego, CA (US); Suhail Jalil, San Diego, CA (US); David Puig Oses, San Diego, CA (US); Yingyong Qi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/757,713

(22) Filed: Jan. 9, 2001

(65) Prior Publication Data

US 2002/0091522 A1 Jul. 11, 2002

(51) Int. Cl.[7] .............................................. G10L 15/00
(52) U.S. Cl. ...................... 704/231; 704/235; 704/236; 704/238; 704/241; 704/251
(58) Field of Search ................................. 704/256, 255, 704/254, 249, 248, 246, 239, 231; 600/300; 382/116; 379/88.01

(56) References Cited

U.S. PATENT DOCUMENTS

| 4,624,010 A | * | 11/1986 | Takebayashi ................ 704/239 |
| 5,056,150 A | * | 10/1991 | Yu et al. ...................... 704/234 |
| 5,621,809 A | * | 4/1997 | Bellegarda et al. .......... 382/116 |
| 5,638,425 A | * | 6/1997 | Meador, III et al. ..... 379/218.01 |
| 5,754,978 A | * | 5/1998 | Perez-Mendez et al. .... 704/239 |
| 5,893,059 A | * | 4/1999 | Raman ......................... 704/236 |
| 6,377,922 B2 | * | 4/2002 | Brown et al. ................ 704/251 |

* cited by examiner

Primary Examiner—Richemond Dorvil
Assistant Examiner—V. Paul Harper
(74) Attorney, Agent, or Firm—Philip Wadsworth; Charles D. Brown; Kyong H. Macek

(57) ABSTRACT

A method and system for speech recognition combines different types of engines in order to recognize user-defined digits and control words, predefined digits and control words, and nametags. Speaker-independent engines are combined with speaker-dependent engines. A Hidden Markov Model (HMM) engine is combined with Dynamic Time Warping (DTW) engines.

10 Claims, 2 Drawing Sheets

SYSTEM AND METHOD FOR HYBRID VOICE RECOGNITION

BACKGROUND

1. Field

The present invention relates generally to the field of communications, and more specifically to voice recognition.

2. Background

Voice recognition (VR) in the past (also commonly referred to as speech recognition) represents one of the most important techniques to endow a machine with simulated intelligence to recognize user or user-voiced commands and to facilitate human interface with the machine. Voice recognition devices are classified as either speaker-dependent (SD) or speaker-independent (SI) devices. Speaker-dependent devices, which are more common, are trained to recognize commands from particular users. In contrast, speaker-independent devices are capable of accepting voice commands from any user. To increase the performance of a given VR system, whether speaker-dependent or speaker-independent, a procedure called training is required to equip the system with valid parameters. In other words, the system needs to learn before it can function optimally.

A speaker-dependent VR system is called a speaker-dependent voice recognition engine (SDVR engine) and a speaker-independent VR system is called a speaker-independent voice recognition engine (SIVR engine). An SDVR engine is more useful than an SIVR engine for recognizing nametags such as names of people or organizations because SDVR engines are trained by a user to recognize nametags. A nametag is an identifier that identifies user-defined information. An SIVR engine is more useful than an SDVR engine for recognizing control words such as digits and keywords engines because SIVR engines do not have to be trained by a user to recognize control words. Thus, it is desirable to combine an SDVR engine with an SIVR engine to recognize both nametags and control words.

Both speaker-independent (SI) Hidden Markov Model (HMM) VR engines and speaker-independent Dynamic Time Warping (DTW) VR engines are useful for recognizing control words, but they may yield different results because they analyze an input speech signal differently. Combining these VR engines may use a greater amount of information in the input speech signal than either VR engine would alone. Consequently, a VR system that combines an SI-HMM with an SI-DTW may provide enhanced accuracy.

An SD-DTW VR engine is speaker adaptive. It adapts to a speaker's speech. An SD-DTW VR (adaptation) engine can be trained by a user to recognizing user-defined and trained control words. Combining an SD-DTW (Adaptation) VR engine with an SI-DTW VR engine enables a VR system to recognize user-defined control words as well as digits and predefined control words.

A system and method for combining an SDVR engine with an SIVR engine and combining SI-HMM VR engines, SI-DTW VR engines, and SD-DTW engines is described in U.S. patent application Ser. No. 09/618,177 (hereinafter '177 application) entitled "Combined Engine System and Method for Voice Recognition", filed Jul. 18, 2000, and U.S. patent application Ser. No. 09/657,760 (hereinafter '760 application) entitled "System and Method for Automatic Voice Recognition Using Mapping," filed Sep. 8, 2000, which are assigned to the assignee of the present invention and fully incorporated herein by reference.

It would be desirable to combine an SI-DTW VR engine with an SD-DTW VR (adaptation) engine to create a combined SI-DTW/SD-DTW(adaptation) VR engine to recognize predefined control words and user-defined control words. It would be desirable to combine an SI-HMM VR engine with the combined SI-DTW/SD-DTW(adaptation) VR engine to generate a combined SI-HMM/SI-DTW/SD-DTW(adaptation) VR engine. The combined SI-HMM/SI-DTW/SD-DTW(adaptation) VR engine would use a greater amount of information in the input speech signal than would having either the HMM VR engine or the combined SI-DTW/SD-DTW(adaptation) VR engine operate alone. It would be desirable to combine an SD-DTW VR (nametag) engine that recognizes nametags with the combined SI-HMM/SI-DTW/SD-DTW(adaptation) VR engine to generate a combined SD-DTW(nametag)/SI-HMM/SI-DTW/SD-DTW(adaptation) VR engine. The combined SD-DTW (nametag)/SI-HMM/SI-DTW/SD-DTW(adaptation) VR engine would recognize user-defined control words, predefined control words, and nametags.

SUMMARY

Embodiments disclosed herein address the above stated needs by combining a plurality of VR engines to recognize predefined digits and control words, user-defined digits and control words, and nametags. In one aspect, a voice recognition system comprises an acoustic processor configured to extract speech parameters from a speech segment, a plurality of different voice recognition engines coupled to the acoustic processor, each voice recognition engine configured to produce a hypothesis and a corresponding score, wherein the score represents a distance from the speech segment to the hypothesis, and decision logic configured to receive the hypotheses from the plurality of different voice recognition engines and selecting a hypothesis by computing a best score for each of the plurality of voice recognition engines and weighting the best scores of the plurality of voice recognition engines. In another aspect, the voice recognition system decision logic is configured to multiply each best score by a coefficient associated with the hypothesis corresponding to the best score to generate a plurality of weighted best scores, and to combine the plurality of weighted best scores to yield a combined score.

DETAILED DESCRIPTION

Figure 1:
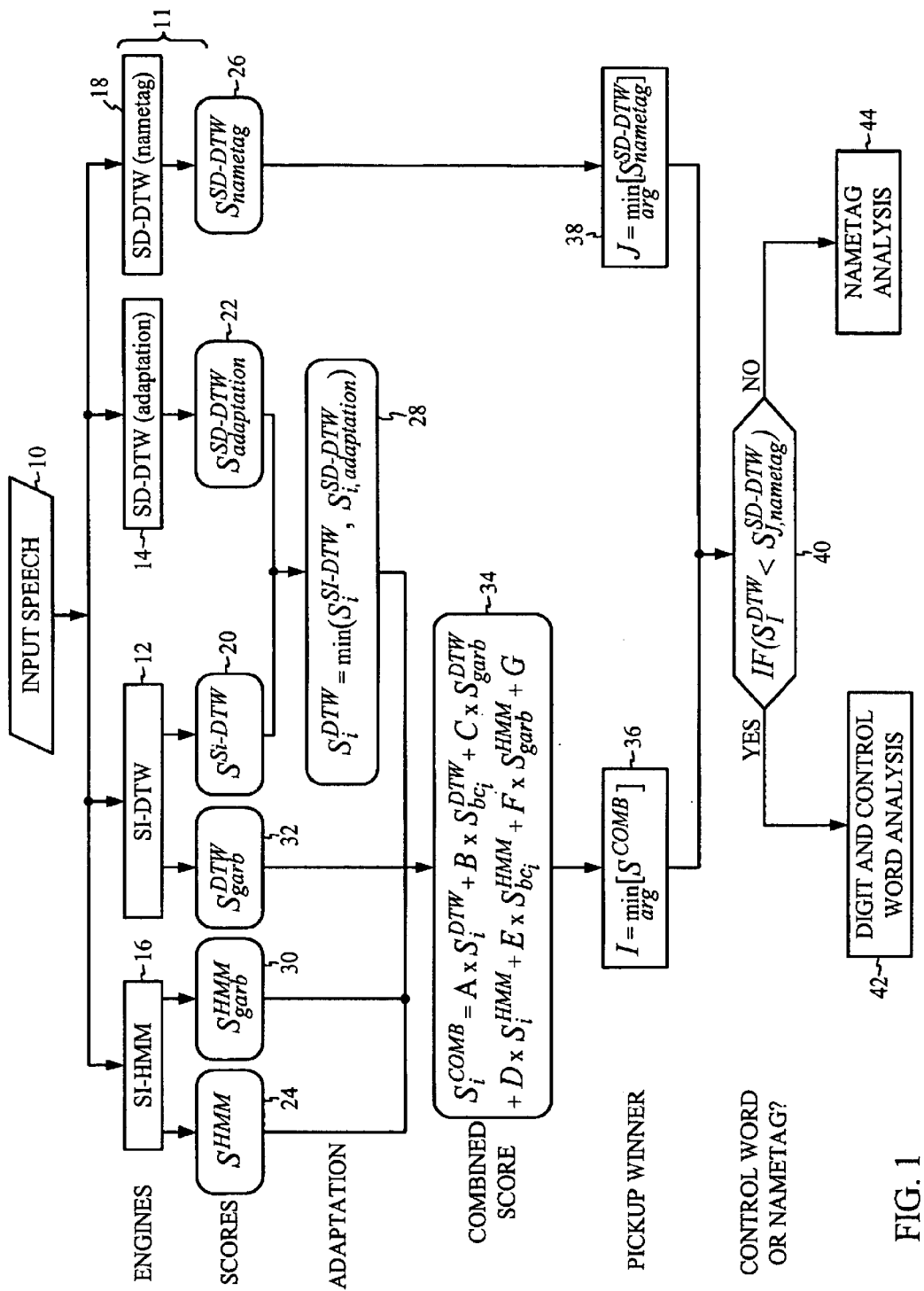
FIG. 1 shows a flowchart of method steps performed by a device having a combined SD-DTW(nametag)/SI-HMM /SD-DTW(adaptation)/SI-DTW VR engine in accordance with one embodiment.

VR represents a key technique for human speech understanding. Devices that employ techniques to recover a linguistic message from an acoustic speech signal are called "voice recognizers." The term "voice recognizer" is used herein to mean generally any spoken-user-interface-enabled device.

The use of VR is becoming increasingly important for safety reasons. For example, VR may be used to replace the manual task of pushing buttons on a wireless telephone keypad. This is especially important when a user is initiating a telephone call while driving a car. When using a car telephone without VR, the driver must remove one hand from the steering wheel and look at the phone keypad while pushing the buttons to dial the call. These acts increase the likelihood of a car accident. A speech-enabled car telephone (i.e., a telephone designed for speech recognition) allows the driver to place telephone calls while continuously watching the road. In addition, a hands-free car-kit system would permits the driver to maintain both hands on the steering wheel during initiation of a telephone call.

In one embodiment, a voice recognition system comprises an acoustic processor, a word decoder, and decision logic. The acoustic processor extracts a sequence of information-bearing features, or vectors, necessary to achieve VR of the incoming raw speech. The word decoder decodes the sequence of features, or vectors, to yield a meaningful and desired output format such as a sequence of linguistic words corresponding to the input utterance. The word decoder generates hypotheses for a speech segment. The decision logic selects a hypothesis that matches the speech segment. A user is an end-consumer that operates a VR device. The word decoder can be any kind of VR engine.

In one embodiment, the voice recognition system includes a speaker-dependent VR engine. A speaker-dependent VR system prompts the user to speak each of the words in the system's vocabulary once or a few times (typically twice) so the system can learn the characteristics of the user's speech for these particular words or phrases. An exemplary vocabulary for a hands-free car kit might include the ten digits; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords, which the VR device recognizes by comparing the spoken utterances with the previously trained utterances (stored as templates) and taking the best match. For example, if the name "John" were one of the trained names, the user could initiate a call to John by saying the phrase "Call John." The VR system would recognize the words "Call" and "John," and would dial the number that the user had previously entered as John's telephone number.

In one embodiment, the voice recognition system includes a speaker-independent VR engine. A speaker-independent VR engine also uses a set of trained templates that allow a predefined vocabulary (e.g., certain control words, the numbers zero through nine, and yes and no). A large number of speakers (e.g., 100) must be recorded saying each word in the vocabulary. An example of a speaker-independent VR engine is the Dynamic Time Warping (DTW) engine described in U.S. patent application Ser. No. 09/615,572 entitled METHOD AND APPARATUS FOR CONSTRUCTING VOICE TEMPLATES FOR A SPEAKER-INDEPENDENT VOICE RECOGNITION SYTEM, filed Jul. 13, 2000, which is assigned to the assignee of the present invention and fully incorporated herein by reference.

A speaker-dependent VR engine and a speaker-independent VR engine may yield different results. A speaker-dependent VR engine performs recognition using templates pertaining to a specific user. A speaker-independent VR engine performs recognition using templates generated using exemplars from an ensemble of users. Since speaker specific templates are closer to a given user's speaking style, SDVR engines provide better accuracy than SIVR engines. However, SIVR engines have the advantage that the users need not go through the "training process" prior to using the system. Combining the results of both SI and SD VR engines can result in a system with better recognition accuracy and lower rejection rates than using the results of only one of the engines.

Different speaker-independent VR engines may yield different results. For example, a speaker-independent (SI) Hidden Markov Model (HMM) VR engine may yield a different result than a speaker-independent Dynamic Time Warping (DTW) VR engine. Combining VR engines of different types provides enhanced accuracy and uses a greater amount of information in the input speech signal. For example, combining a SI-HMM VR engine with a SI-DTW VR engine would use a greater amount of information in the speech signal than using either VR engine by itself. It would be understood by those skilled in the art that any two types of VR engines can be combined and is within the scope of the invention.

An SD-DTW VR engine can be used to recognize digits, control words, and nametags. In one embodiment, an SD-DTW(adaptation) VR engine trained to recognize digits and control words is combined with an SI-DTW VR engine that recognizes predefined digits and control words to create an SD-DTW(adaptation)/SI-DTW(adaptation) VR engine that recognizes user-defined (trained) digits and control words, and predefined digits and control words. Then, the results of both these VR engines are compared. An example of a user-defined digit is when a user trains a base-10 VR system to recognize a hexadecimal "A" as "10" in base-10.

In another embodiment, an SI-HMM VR engine is combined with the SD-DTW(adaptation)/SI-DTW VR engine to create a combined SI-HMM /SD-DTW(adaptation)/SI-DTW VR engine in order to use more information of the input speech signal than would be used by either VR engine operating alone.

In yet another embodiment, an SD-DTW(nametag) VR engine is combined with the combined SI-HMM /SD-DTW (adaptation)/SI-DTW VR engine to create a combined SD-DTW(nametag)/SI-HMM /SD-DTW(adaptation)/SI-DTW VR engine that further recognizes nametags. Thus, the combined SD-DTW(nametag)/SI-HMM /SD-DTW (adapatation)/SI-DTW VR engine recognizes predefined digits and control words, user-defined digits and control words.

In accordance with one embodiment, a flowchart of method steps performed by a device having a combined SD-DTW(nametag)/SI-HMM /SD-DTW(adaptation)/SI-DTW VR engine 11 is shown in FIG. 1. The decision logic of the device executes the method steps. The SI-DTW VR engine 12 is combined with the SD-DTW(adaptation) VR engine 14. The SI-HMM VR engine 16 is combined with the combination of the SI-DTW VR engine 12 and SD-DTW (adaptation) VR engine 14. The SD-DTW(nametag) VR engine 18 is combined with the combination of the SI-HMM VR engine 16 combined with the combination of the SI-DTW VR engine 12 and the SD-DTW(adaptation) VR engine 14, thereby creating a combined SD-DTW(nametag)/SI-HMM /SD-DTW(adaptation)/SI-DTW VR engine (hereinafter mutli-combination VR engine or MCVR engine for short).

In step 10, a speech signal segment is input to the MCVR engine 11. Each VR engine within the MCVR engine 11 operates on the input speech segment, i.e., tries to recognize the input speech segment. Each VR engine of the MCVR engine 11 produces N hypotheses (not shown) and corresponding N scores, where N=1, 2, ... m and m is a positive integer. Each score corresponds to a hypothesis and indicates a distance from a hypothesis to the input speech segment, i.e., how close the hypothesis is to the input speech segment.

Thus, in step 20, the SI-DTW VR engine produces an N-element array of scores $S^{SI-DTW}$; in step 22, the SD-DTW (adaptation) VR engine produces an N-element array of scores $S^{SD-DTW}_{adaptation}$; in step 24, the SI-HMM VR engine produces an N element array of scores $S^{HMM}$; and in step 26, the SD-DTW(nametag) VR engine produces an N element array of scores $S^{SD-DTW}_{nametag}$. Each array has the same number of elements N for discussion purposes only. It would be understood by those skilled in the art that the array of scores produced by each VR engine can have a different number of elements N and is within the scope of the invention.

In step 28, the N-element array of scores $S^{DTW}$ is the result of applying a minimum function to the N-element array of scores $S^{SI-DTW}$ and the array of scores $S^{SD-DTW}_{adaptation}$. The minimum function operates on arrays, such that an ith element in a first array is compared to an ith elment in a second array for each element i. Thus, each ith element in $S^{DTW}$ is compared to each ith element in $S^{SI-DTW}$ and the element that has the lowest score gets put into $S^{DTW}$. Minimization is the process of choosing the hypothesis with the lowest cost.

Garbage models are used to determine whether an input speech segment is garbage, i.e., cannot be recognized. It would be understood by those skilled in the art, that any HMM and DTW garbage models known in the art can be used to determine whether an HMM and DTW hypothesis, respectively is garbage, and is within the scope of the invention. In step 30, the SI-HMM VR engine produces a scalar garbage score $S^{HMM}_{garb}$, which is the distance between the input speech segment and an HMM garbage template. The SI-DTW VR engine and the SD-DTW (adaptation) VR engine share the same garbage model (not shown) and therefore in step 32, there in only one score $S^{DTW}_{garb}$ that is produced by the SI-DTW VR engine and the SD-DTW(adaption) VR engine. Score $S^{DTW}_{garb}$ is the distance between the input speech segment and a DTW garbage template. In one embodiment, the score $S^{DTW}_{garb}$ is produced by the SI-DTW VR engine 12 as shown in FIG. 1. In another embodiment, the score $S^{DTW}_{garb}$ is produced by the SD-DTW(adaptation) VR engine 14.

In step 34, a combined score $S_i^{COMB}$ is calculated for all elements in the score arrays. $S_i^{COMB}$ is a linear combination of the HMM scores $S_1^{HMM}$, $S_{bci}^{HMM}$, DTW scores $S_1^{DTW}$, $S_{bci}^{DTW}$, and garbage scores $S^{HMM}_{garb}$, $S^{DTW}_{garb}$. Training determines the coefficients A, B, C, D, E, and F, and constant G in order to minimize misclassifications of input speech segments. In one embodiment, $S_i^{COMB}=A*S_i^{DTW}+B*S_{bci}^{DTW}+C*S^{DTW}_{garb}+D*S_i^{HMM}+E*S_{bci}^{HMM}+F*S^{HMM}_{garb}+G$.

The coefficients are weighting factors. The training process generates the coefficients A, B, C, D, E, and F so that they maximize the weighted sum for recognition of a correct hypothesis and minimize the weighted sum for recognition of an incorrect hypotheses. The mapping function can be constructed or trained objectively to minimize false acceptance/rejection errors. In one embodiment, the coefficients are obtained from training. In the training process, the identity of each testing sample is known. A measurement vector of one word among many words is marked as correct (+1), and the rest are marked as incorrect (−1). Training determines the value of a coefficient vector $c=c_i(i=0,1,\ldots n)$ from meausurement vectors in order to minimize the number of misclassifications.

In step 36, the best score I is selected from $S_i^{COMB}$ by taking the smallest score from $S_i^{COMB}$. The I score is the best score for digits and control words. In step 38, the best score J is selected from $S^{SD-DTW}_{nametag}$ by taking the smallest score from $S^{SD-DTW}_{nametag}$. The J score is the best score for nametags. In step 40, a check is made to determine which score of the I score (digits and control words) and the J score (nametags) is smaller. If the I score is smaller, then in step 42, a digit and control word analysis is performed on the ith element in $S_i^{COMB}$ to determine whether to reject or accept the digit or control word corresponding to the ith element. If the J score is smaller, then in step 44, a nametag analysis is performed on the ith element in $S^{SD-DTW}_{nametag}$ to reject or accept the nametag corresponding to the jth element.

Figure 2:
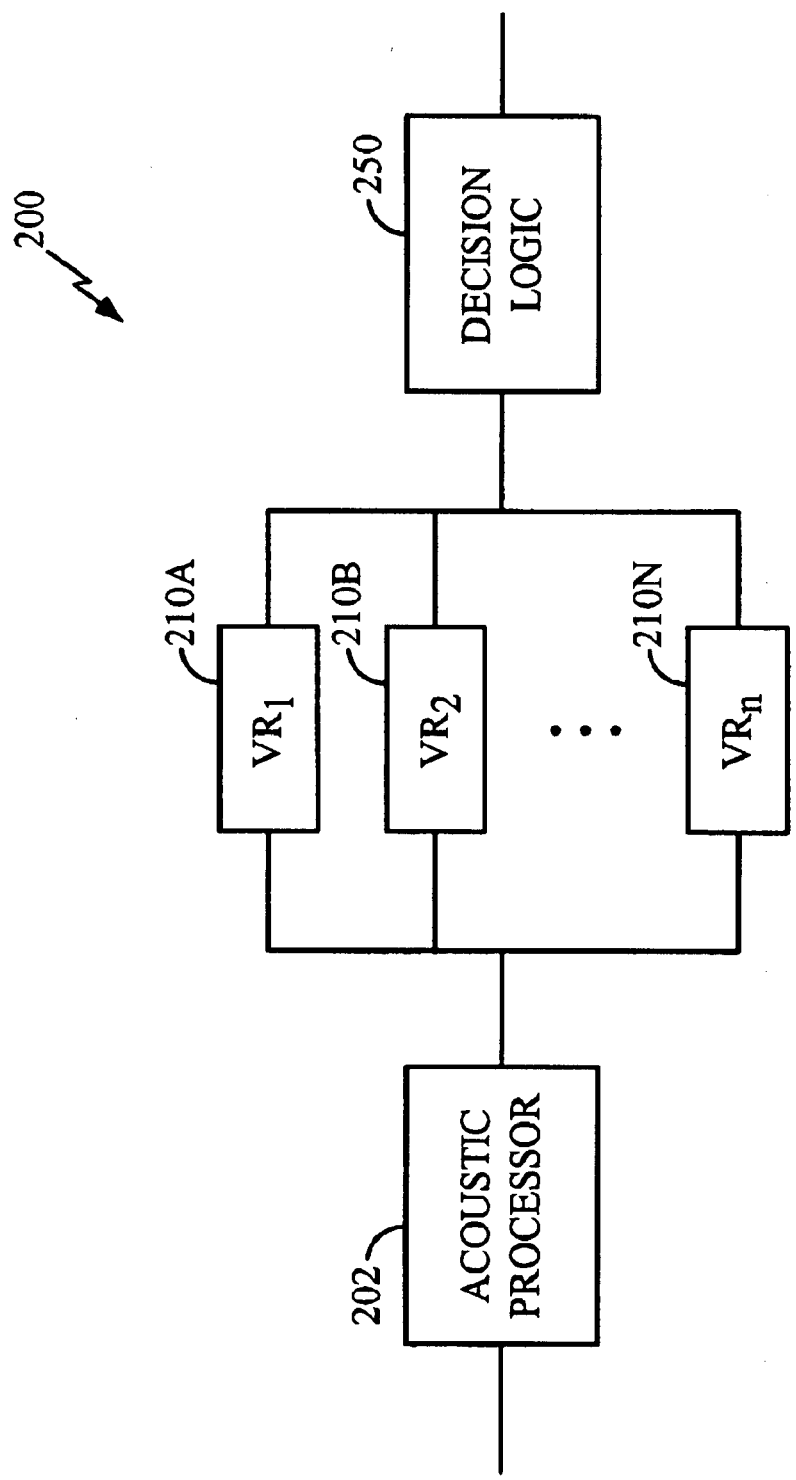
FIG. 2 shows a block diagram of a voice recognition system 200 in accordance with an embodiment.

FIG. 2 shows a block diagram of a voice recognition system 200 in accordance with an embodiment. The voice recognition system 200 comprises an acoustic processor 202 configured to extract speech parameters from a speech segment, a plurality of different voice recognition engines $VR_i$, where i=1, 2, . . . n, 210A-N, coupled to the acoustic processor 202, each voice recognition engine 210A-N configured to produce a hypothesis and a corresponding score, wherein the score represents a distance from the speech segment to the hypothesis, and decision logic 250 configured to receive the hypotheses from the plurality of different voice recognition engines 210A-N and selecting a hypothesis by computing a best score for each of the plurality of voice recognition engines 210A-N and weighting the best scores of the plurality of voice recognition engines 210A-N. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A voice recognition system, comprising:
   an acoustic processor configured to extract speech parameters from a speech segment;
   a plurality of different voice recognition engines coupled to the acoustic processor, wherein each voice recognition engine is configured to produce a plurality of hypotheses and a plurality of scores, each score represents a distance from the speech segment to a corresponding hypothesis, and at least one of the voice recognition engines is a nametag engine; and
   a decision logic configured to:
      receive the plurality of scores from the plurality of different voice recognition engines,
      compute a combined score for a subset of the plurality of voice recognition engines, wherein the subset excludes the nametag engine,
      determine a best score for the subset and a best score for the nametag engine,
      compare the best score for the subset against the best score for the nametag engine.

2. The voice recognition system of claim 1, wherein the decision logic is configured to compute the combined score by:
   arranging each of the plurality of scores in an array;
   comparing corresponding elements in at least two arrays to create a new array with the lowest scores of the at least two arrays; and
   multiplying each array, except the at least two arrays used to create the new array, by a weighting coefficient in order to generate a plurality of weighted arrays, and to combine the plurality of weighted arrays to yield a combined score.

3. The voice recognition system of claim 1, wherein the plurality of different voice recognition engines includes a speaker-independent voice recognition engine.

4. The voice recognition system of claim 3 wherein the plurality of different voice recognition engines includes a speaker-dependent voice recognition engine.

5. The voice recognition system of claim 1, wherein the plurality of different voice recognition engines includes a speaker-dependent voice recognition engine.

6. The voice recognition system of claim 1, wherein the speaker-independent voice recognition engine is a Hidden Markov Model voice recognition engine.

7. The voice recognition system of claim 1, wherein the speaker-independent voice recognition engine is a Dynamic Time Warping voice recognition engine.

8. A method of voice recognition, comprising:
   extracting speech parameters from a speech segment;
   producing a hypothesis and a corresponding score for each different voice recognition engine of a plurality of different voice recognition engines based on the extracted speech parameters, wherein the score represents a distance from the speech segment to the hypothesis;
   computing a minimum score for each of the plurality of different voice recognition engines;
   computing a combined score by weighting the minimum scores of the plurality of voice recognition engines; and
   using the combined score to select an analysis method to be performed on a hypothesis corresponding to the smallest score.

9. An apparatus to be used for voice recognition, comprising:
   means for extracting speech parameters from a speech segment;
   means for producing a hypothesis and a corresponding score for each different voice recognition engine of a plurality of different voice recognition engines based on the extracted speech parameters, wherein the score represents a distance from the speech segment to the hypothesis;
   means for computing a minimum score for each of the plurality of different voice recognition engines;
   means for computing a combined score by weighting the minimum scores of the plurality of voice recognition engine hypothesis; and
   means for using the combined score to select an analysis method to be performed on a hypothesis corresponding to the smallest score.

10. A computer readable media embodying a method of voice recognition, the method comprising:
    extracting speech parameters from a speech segment;
    producing a hypothesis and a corresponding score for each different voice recognition engine of a plurality of different voice recognition engines based on the extracted speech parameters, wherein the score represents a distance from the speech segment to the hypothesis;
    computing a minimum score for each of the plurality of different voice recognition engines;
    computing a combined score by weighting the minimum scores of the plurality of voice recognition engines; and
    using the combined score to select an analysis method to be performed on a hypothesis corresponding to the smallest score.

* * * * *